United States Patent Office 3,708,498
Patented Jan. 2, 1973

3,708,498
RECOVERY OF PURE CIS 11-(3-DIMETHYLAMINO-PROPYLIDENES) - 6,11 - DIHYDROBENZ (b,e) OXEPINE FROM ADMIXTURE WITH ITS TRANS ISOMER
Susumu Nakanishi, East Lyme, Conn., assignor to Pfizer Inc., New York, N.Y.
No Drawing. Filed Nov. 4, 1970, Ser. No. 87,019
Int. Cl. C07d 9/00
U.S. Cl. 260—333                    2 Claims

ABSTRACT OF THE DISCLOSURE

Recovery of pure cis 11-(3-dimethylaminopropylidene)-6,11-dihydrodibenz (b,e) oxepine from admixture with its trans isomer is described.

BACKGROUND OF THE INVENTION

As is well known, many propylidene-substituted compounds are valuable as psychotherapeutic agents in the chemotherapy of mental diseases, and especially for the treatment of depressed or excited states. Compounds in this series and their methods of preparation are described in U.S. Pat. 3,354,155. Of special interest is the compound 11 - (3-dimethylaminopropylidene) - 6,11-dihydrodibenz (b,e) oxepine described in U.S. Pat. 3,420,851 as a mixture of the cis and trans isomers. U.S. Pat. 3,509,175 teaches a method for recovering pure cis 11-(3-dimethylaminopropylidene)-6,11-dihydrodibenz (b,e) oxepine from admixture with the trans isomer by dissolving the admixture in salt form in chloroform-carbon tetrachloride and separating the cis isomer of lower solubility. However, the yield is not satisfactory, and there is need for an overall process leading to the recovery of pure cis 11-(3-dimethylaminopropylidene)-6,11-dihydrodibenz (b,e) oxepine in high yields.

SUMMARY OF THE INVENTION

This invention is concerned with an improved process for preparing pure cis 11-(3-dimethylaminopropylidene)-6,11-dihydrodibenz (b,e) oxepine. 11-(3-dimethylaminopropylidene)-6,11-dihydrodibenz (b,e) oxepine is prepared by reacting 6,11-dihydrodibenz (b,e) oxepine with the reaction product of 3-dimethylaminopropyltriphenyl phosphonium bromide and butyl lithium, extracting the basified reaction solution with a water-immiscible organic solvent and recovering the pure cis isomer of the said oxepine by dissolving the admixture of the cis and trans isomers of the said oxepine in salt form in chloroform-carbon tetrachloride and separating the cis isomer of lower solubility. In the improved process of this invention, the use of ethyl acetate, chloroform or methylene chloride as the extracting solvent makes possible an increase in the overall recovery yield of pure cis 11-(3-dimethylaminopropylidene)-6,11-dihydrodibenz (b,e) oxepine. It is also possible to recover pure trans isomer from the trans enriched mother liquor.

DETAILED DESCRIPTION OF THE INVENTION

As described in U.S. Pat. 3,509,175, 11-(3-dimethylaminopropylidene)-6,11-dihydrodibenz (b,e) oxepine is prepared by suspending anhydrous 3-dimethylaminopropyltriphenylphosphonium bromide hydrobromide in dry tetrahydrofuran to which is then added butyl lithium in hexane. This reaction mixture is then refluxed with 6,11-dihydrodibenz (b,e) oxepine-11-one. The reaction is quenched with water and the tetrahydrofuran removed in vacuo. Triphenylphosphine oxide is removed by pH adjustment to 2 and extraction with benzene. The aqueous solution is rendered basic with sodium hydroxide solution and extracted several times with benzene. The benzene layer is dried over anhydrous sodium sulfate and decolorized with charcoal. Evaporation of the solvent leaves a residue comprising an admixture of the cis and trans isomers of 11-(3-dimethylaminopropylidine)-6,11-dihydrodibenz (b,e) oxepine. The pure cis isomer is recovered from the admixture by dissolving the admixture in chloroform, acidifying with a slight excess of anhydrous hydrogen chloride and diluting the solution with carbon tetrachloride. The crystalline material that separates is filtered, washed with carbon tetrachloride and recrystallized from chloroform-carbon tetrachloride (1:1). Paper and thin layer chromatography confirm freedom from the presence of trans isomer.

One of the disadvantages of the above described procedure involves the important step of removing all the triphenylphosphine oxide in the reaction mixture. While most of this toxic and undesirable material is removed by repeated extractions with benzene at pH 2, trace amounts remain which are then extracted by the benzene along with the oxepine after the reaction solution is made alkaline. In the subsequent step for the separation and recovery of the cis isomer of the oxepine, repeated recrystallizations are necessary to remove all contaminating traces of triphenylphosphine oxide. The overall recovery yield of the desired cis isomer of the oxepine is lowered to approximately 55%, based on ketone, because of the losses suffered at each recrystallization.

The triphenylphosphine oxide problem is obviated by the use of a selective solvent such as ethyl acetate, methylene chloride or chloroform which have a high distribution coefficient for 11-(3-dimethylaminopropylidene)-6,11-dihydrodibenz (b,e) oxepine and a very low extractability of triphenylphosphine oxide.

The overall yield of pure cis 11-(3-dimethylaminopropylidine)-6,11-dihydrodibenz (b,e) oxepine, based on ketone, is increased from approximately 55% to about 85% by improvements comprising the process of this invention.

After completion of the reaction described above and removal of tetrahydrofuran and triphenylphosphine oxide, the basified solution is extracted with ethyl acetate. This gives crude 11-(3-dimethylaminopropylidene)-6,11-dihydrodibenz (b,e) oxepine consisting of 85–87% cis/13–15% trans mixture in 92% yield. Extraction with chloroform in the place of ethyl acetate gives a 96% yield of the crude product consisting of 90% cis/10% trans mixture. Similar results are obtained by extraction of the alkaline reaction mixture with methylene chloride. Selective recrystallizations from chloroform-carbon tetrachloride yield the cis isomer in 98% purity as established by thin layer and paper chromatography.

The present invention is illustrated by the following examples, which are not to be considered as limiting the scope thereof in any way.

PREPARATION A

Under nitrogen atmosphere, to a stirred slurry of 76.5 g. (150 m. moles) of triphenyl-3-dimethylaminopropylphosphonium bromide hydrobromide in 225 ml. of dry tetrahydrofuran, was added dropwise 187.5 ml. (300 m. moles) of butyl lithium hexane solution (1.6 M solution in hexane from Foote Mineral Co.) during 35 minute periods at 25 to 30° C. Then 24.15 g. (115 m. moles) of 6,11-dihydrodibenz (b,e) oxepine-11-one was added in one portion. The resulting reaction mixture was slowly heated to reflux under nitrogen atmosphere and stirred at reflux (ca. 57° C.) for 6 hours, and then further stirred at room temperature overnight (ca. 16 hours). Water (100 ml.) was added from a dropping funnel as a slow steady stream. The organic solvents were removed in vacuo leaving a thick aqueous slurry. Additional 100 ml. of water was added and the pH was adjusted to 2 by the addition of 10% hydrochloric acid. Then 650 ml. of water and 1250 ml. of benzene were added. The benzene layer extract was washed with 250 ml. of water, and the combined aqueous layers were adjusted to pH 9 to 10 with 10% sodium hydroxide.

EXAMPLE I

The alkaline solution described above was extracted with three 500 ml. portions of ethyl acetate. The ethyl acetate extracts were combined and washed with two 250 ml. portions of water followed by 250 ml. of saturated sodium chloride aqueous solution. After drying over anhydrous magnesium sulfate, the ethyl acetate extract was treated with 7.65 g. of activated charcoal (Darco KB) and filtered. The filtrate was treated with gaseous hydrogen chloride to pH 2. The volume of ethyl acetate was reduced in vacuo to about 250 ml. and cooled with ice water. The crystals of 11-(3-dimethylaminopropylidene)-6,11-dihydrodibenz (b,e) oxepine hydrochloride were filtered and dried in vacuo overnight. The weight of product was 33.5 g. (92% yield, base on ketone), M.P. 187–194° C. Paper chromatography showed the product to be an 87% cis/4% trans admixture. Three recrystallizations from chloroform-carbon tetrachloride (1:1) gave an overall yield of 84.2% of the pure cis isomer.

EXAMPLE II

The method of Example I was repeated with chloroform as the extracting solvent in place of ethyl acetate, with comparable results.

EXAMPLE III

The method of Example I was repeated with methylene chloride as the extracting solvent in place of ethyl acetate, with comparable results.

What is claimed is:

1. In the process of preparing 11-(3-dimethylaminopropylidene)-6,11-dihydrodibenz (b,e) oxepine by reacting 6,11-dihydrodibenz (b,e) oxepine with the reaction product of 3-dimethylaminopropyltriphenyl phosphonium bromide with butyl lithium, extracting the basified reaction solution with a water-immiscible organic solvent and recovering said oxepine, the improvement which comprises employing ethyl acetate, chloroform or methylene chloride as said solvent.

2. The process of claim 1 wherein said oxepine is further refined by dissolving in salt form in chloroform-carbon tetrachloride and separating the isomer of lower solubility.

References Cited

UNITED STATES PATENTS

| | | | |
|---|---|---|---|
| 3,420,851 | 1/1969 | Bloom et al. | 260—333 |
| 3,452,095 | 6/1969 | Muttenz et al. | 260—333 X |
| 3,509,175 | 4/1970 | Tretter | 260—333 |
| 3,546,226 | 12/1970 | Schmutz et al. | 260—333 X |
| 3,600,391 | 8/1971 | Mastursi et al. | 260—333 X |

NORMA S. MILESTONE, Primary Examiner